US009818590B2

(12) United States Patent
Cox et al.

(10) Patent No.: US 9,818,590 B2
(45) Date of Patent: Nov. 14, 2017

(54) DATA QUALITY AFTER DEMULTIPLEXING OF OVERLAPPED ACQUISITION WINDOWS IN TANDEM MASS SPECTROMETRY

(71) Applicant: DH TECHNOLOGIES DEVELOPMENT PTE. LTD., Singapore (SG)

(72) Inventors: David M. Cox, North York (CA); Stephen A. Tate, Barrie (CA); Lyle Burton, Woodbridge (CA)

(73) Assignee: DH Technologies Development Pte. Ltd., Singapore (SG)

( * ) Notice: Subject to any disclaimer, the term of this patent is extended or adjusted under 35 U.S.C. 154(b) by 174 days.

(21) Appl. No.: 14/889,139

(22) PCT Filed: Jun. 3, 2014

(86) PCT No.: PCT/IB2014/000944
§ 371 (c)(1),
(2) Date: Nov. 4, 2015

(87) PCT Pub. No.: WO2014/195785
PCT Pub. Date: Dec. 11, 2014

(65) Prior Publication Data

US 2016/0086783 A1 Mar. 24, 2016

Related U.S. Application Data

(60) Provisional application No. 61/832,111, filed on Jun. 6, 2013.

(51) Int. Cl.

| | |
|---|---|
| ***G01N 24/00*** | (2006.01) |
| ***H01J 49/04*** | (2006.01) |
| ***H01J 49/00*** | (2006.01) |

(52) U.S. Cl.
CPC ............ *H01J 49/04* (2013.01); *H01J 49/004* (2013.01); *H01J 49/0027* (2013.01); *H01J 49/0036* (2013.01)

(58) Field of Classification Search
CPC .. H01J 49/004; H01J 49/0045; H01J 49/0027; H01J 49/26; G01N 33/6848;
(Continued)

(56) References Cited

U.S. PATENT DOCUMENTS

2005/0261838 A1 11/2005 Andreev et al.
2010/0280764 A1 11/2010 Thomson et al.
(Continued)

FOREIGN PATENT DOCUMENTS

WO 2013044401 A1 4/2013

OTHER PUBLICATIONS

Röst et al., "OpenSWATH enables automated, targeted analysis of dataindependent acquisition MS data", A Letter to Editor, Nature Biotechnology, Mar. 2014, v. 32, No. 3, pp. 219-223.*
(Continued)

*Primary Examiner* — Yelena G Gakh
(74) *Attorney, Agent, or Firm* — John R. Kasha; Kelly L. Kasha; Kasha Law LLC

(57) ABSTRACT

Systems and methods are provided for identifying missing product ions after demultiplexing product ion spectra produced by overlapping precursor ion transmission windows in sequential windowed acquisition tandem mass spectrometry. Overlapping sequential windowed acquisition is performed on a sample. A first precursor mass window and the corresponding first product ion spectrum are selected from a plurality of overlapping stepped precursor mass windows and their corresponding product ion spectra. A product ion spectrum is demultiplexed for each overlapped portion of the first precursor mass window producing two or more
(Continued)

demultiplexed first product ion spectra for the first precursor mass window. The two or more demultiplexed first product ion spectra are added together producing a reconstructed summed demultiplexed first product ion spectrum. Missing product ions are identified in the summed demultiplexed first product ion spectrum by comparing the summed demultiplexed first product ion spectrum and the first product ion spectrum.

20 Claims, 14 Drawing Sheets

(58) Field of Classification Search
CPC ............... G01N 30/8631; G01N 30/72; G01N 30/8644; G01N 30/8675; G01N 30/8679; G01N 30/8693; G01N 30/8634; G01N 30/86; G01N 2030/628
See application file for complete search history.

(56) References Cited

U.S. PATENT DOCUMENTS

2011/0172115 A1 7/2011 Thompson
2011/0248162 A1 10/2011 Markarov et al.

OTHER PUBLICATIONS

International Search Report and Written Opinion for PCT/IB2014/000944, dated Oct. 16, 2014.

* cited by examiner

1100

1200

1300

DATA QUALITY AFTER DEMULTIPLEXING OF OVERLAPPED ACQUISITION WINDOWS IN TANDEM MASS SPECTROMETRY

CROSS REFERENCE TO RELATED APPLICATION

This application claims the benefit of U.S. Provisional Patent Application Ser. No. 61/832,111, filed Jun. 6, 2013, the content of which is incorporated by reference herein in its entirety.

INTRODUCTION

A current mass spectrometry technique, sequential windowed acquisition (SWATH™), can use overlapping acquisition windows to acquire data. Narrower windows can be extracted from the acquired data by demultiplexing the signal. Essentially, this technique involves adding overlapping related scans together, and subtracting unrelated scans from adjacent cycles to get a SWATH™ scan that now contains fragments from a Q1 window that is narrower than the original acquisition.

One potential problem with this technique is that when similar compounds are in adjacent windows, the resulting fragments are subtracted from both (all) demultiplexed windows. For example, a compound and an in-source loss of water ion from the same compound are separated by 18 Da. A 25 Da SWATH™ experiment, with a 12.5 Da overlap between each cycle enables demultiplexing of the signal into 12.5 Da windows. However, the fragmentation patterns of these two ions are almost identical. Therefore the subtraction of the overlapping windows results in the loss of some, or all, of the signal resulting from these fragments, from all demultiplexed windows.

Another potential problem with this technique is that the demultiplexing assumes square Q1 transmission windows, and it assumes that fragments are a result of compounds spread equally across this Q1 window.

Faster, more sensitive instruments can acquire the narrower SWATH™ windows directly. However, demultiplexing combined with faster, more sensitive instruments can then achieve even narrower windows.

SUMMARY

A system is disclosed for identifying missing product ions after demultiplexing product ion spectra produced by overlapping precursor ion transmission windows in sequential windowed acquisition tandem mass spectrometry. The system includes a tandem mass spectrometer and a processor.

The tandem mass spectrometer performs overlapping sequential windowed acquisition on a sample. On each cycle, the tandem mass spectrometer steps a precursor mass window across a mass range, fragments transmitted precursor ions of each stepped precursor mass window, and analyzes product ions produced from the fragmented transmitted precursor ions. Between at least two cycles, the tandem mass spectrometer shifts the stepped precursor mass window to produce overlapping mass windows between the at least two cycles. The overlapping sequential windowed acquisition produces a product ion spectrum for each stepped precursor mass window for each cycle of the at least two cycles.

The processor receives a plurality of overlapping stepped precursor mass windows and their corresponding product ion spectra for the at least two cycles from the tandem mass spectrometer. The processor selects a first precursor mass window and the corresponding first product ion spectrum from the plurality of overlapping stepped precursor mass windows and their corresponding product ion spectra. The processor demultiplexes a product ion spectrum for each overlapped portion of the first precursor mass window producing two or more demultiplexed first product ion spectra for the first precursor mass window.

For example, for each overlapped portion of the first precursor mass window, the processor (a) adds the first product ion spectrum and a product ion spectrum of an overlapping precursor mass window producing a summed product ion spectrum and (b) subtracts product ion spectra of two or more precursor mass windows adjacent to the first precursor mass window and the overlapping precursor mass window that overlap with non-overlapping portions of the first precursor mass window and the overlapping precursor mass window from the summed product ion spectrum one or more times.

The processor adds the two or more demultiplexed first product ion spectra together producing a reconstructed summed demultiplexed first product ion spectrum.

Finally, the processor identifies missing product ions in the summed demultiplexed first product ion spectrum by comparing the summed demultiplexed first product ion spectrum and the first product ion spectrum.

A method is disclosed for identifying missing product ions after demultiplexing product ion spectra produced by overlapping precursor ion transmission windows in sequential windowed acquisition tandem mass spectrometry. Overlapping sequential windowed acquisition is performed on a sample using a tandem mass spectrometer, producing a product ion spectrum for each stepped precursor mass window for each cycle of the at least two cycles.

A plurality of overlapping stepped precursor mass windows and their corresponding product ion spectra are received for the at least two cycles from the tandem mass spectrometer using a processor. A first precursor mass window and the corresponding first product ion spectrum are selected from the plurality of overlapping stepped precursor mass windows and their corresponding product ion spectra using the processor. A product ion spectrum is demultiplexed for each overlapped portion of the first precursor mass window producing two or more demultiplexed first product ion spectra for the first precursor mass window using the processor.

The two or more demultiplexed first product ion spectra are added together producing a reconstructed summed demultiplexed first product ion spectrum using the processor. Missing product ions are identified in the summed demultiplexed first product ion spectrum by comparing the summed demultiplexed first product ion spectrum and the first product ion spectrum using the processor.

A computer program product is disclosed that includes a non-transitory and tangible computer-readable storage medium whose contents include a program with instructions being executed on a processor so as to perform a method for identifying missing product ions after demultiplexing product ion spectra produced by overlapping precursor ion transmission windows in sequential windowed acquisition tandem mass spectrometry. The system includes a measurement module and an analysis module.

The measurement module receives a plurality of overlapping stepped precursor mass windows and their corresponding product ion spectra for the at least two cycles from a tandem mass spectrometer. The tandem mass spectrometer performs overlapping sequential windowed acquisition on a sample, producing a product ion spectrum for each stepped precursor mass window for each cycle of the at least two cycles.

The analysis module selects a first precursor mass window and the corresponding first product ion spectrum from the plurality of overlapping stepped precursor mass windows and their corresponding product ion spectra. The analysis module demultiplexes a product ion spectrum for each overlapped portion of the first precursor mass window producing two or more demultiplexed first product ion spectra for the first precursor mass window.

The analysis module adds the two or more demultiplexed first product ion spectra together producing a reconstructed summed demultiplexed first product ion spectrum. The analysis module identifies missing product ions in the summed demultiplexed first product ion spectrum by comparing the summed demultiplexed first product ion spectrum and the first product ion spectrum.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Before one or more embodiments of the invention are described in detail, one skilled in the art will appreciate that the invention is not limited in its application to the details of construction, the arrangements of components, and the arrangement of steps set forth in the following detailed description. The invention is capable of other embodiments and of being practiced or being carried out in various ways. Also, it is to be understood that the phraseology and terminology used herein is for the purpose of description and should not be regarded as limiting.

DESCRIPTION OF VARIOUS EMBODIMENTS

Computer-Implemented System

Figure 1:
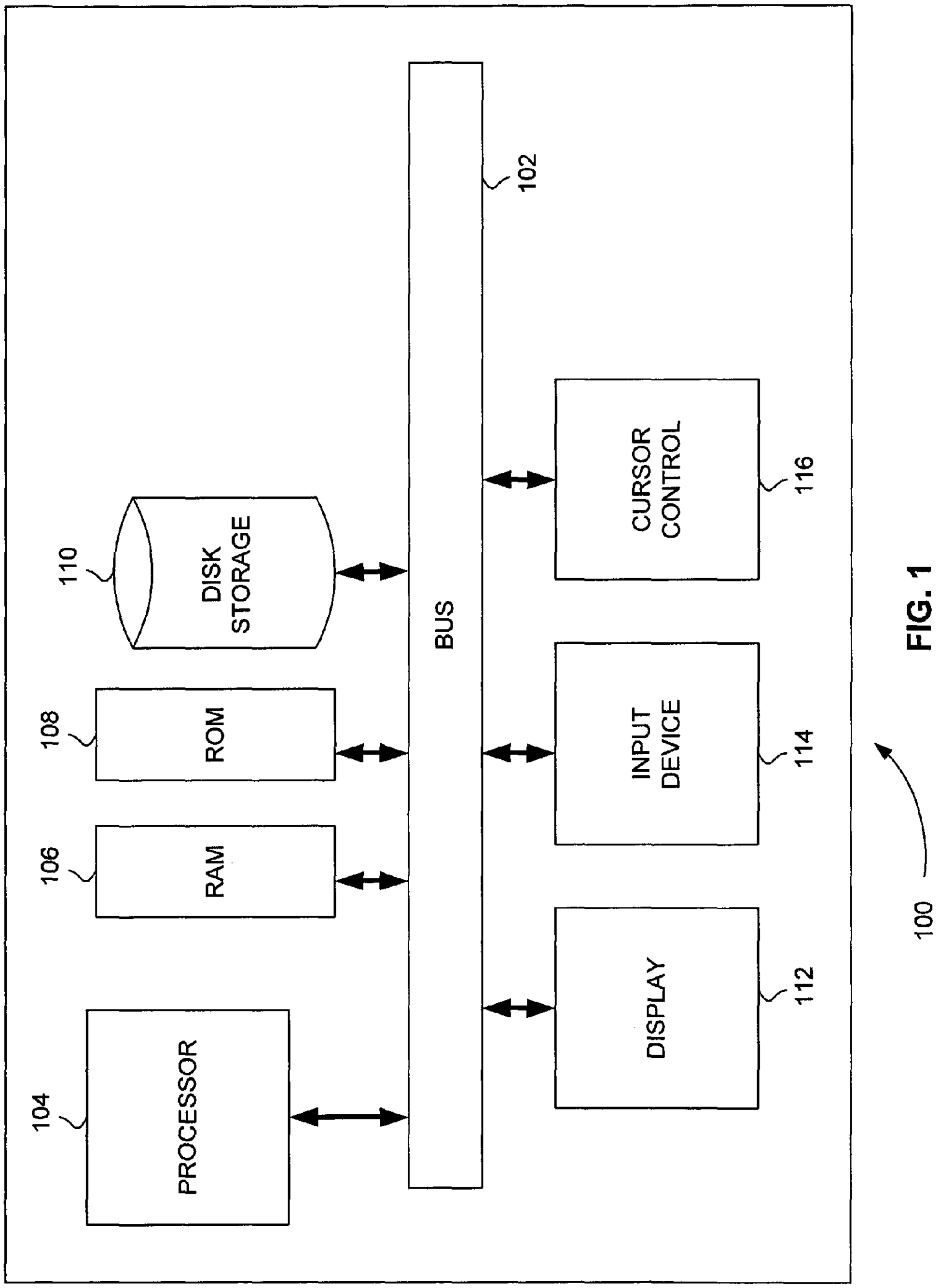
FIG. 1 is a block diagram that illustrates a computer system, upon which embodiments of the present teachings may be implemented.

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods for Identifying Missing Product Ions in an Overlapping Swath Experiment As described above, sequential windowed acquisition (SWATH™) can use overlapping acquisition windows to acquire data. Narrower windows can be extracted from the acquired data by demultiplexing the signal. Demultiplexing or deconvoluting the signal involves adding overlapping related scans together, and subtracting unrelated scans from adjacent cycles, to get a SWATH™ scan that now contains fragments from a Q1 window that is narrower than the original acquisition. One potential problem affecting the data quality of this technique is that when similar compounds are in adjacent windows, the resulting fragments are subtracted from both (all) demultiplexed windows.

Figure 2:
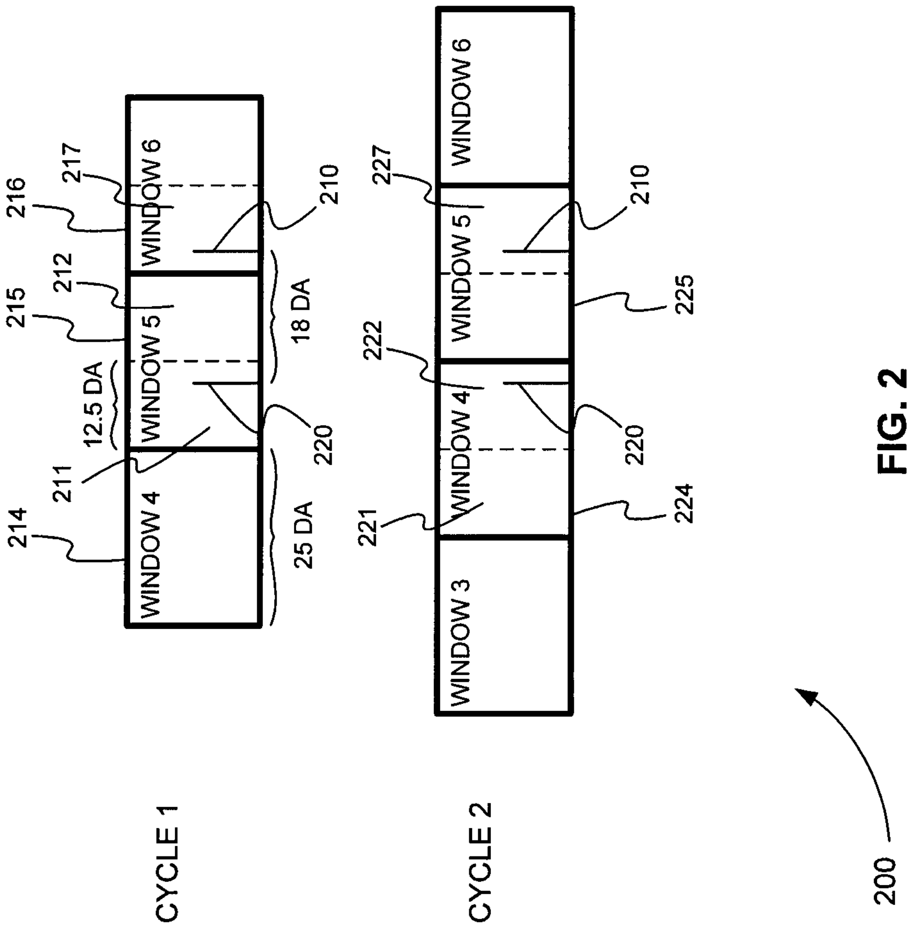
FIG. 2 is an exemplary diagram showing overlapping precursor ion transmission windows in a sequential windowed acquisition experiment where similar compounds are in adjacent windows, in accordance with various embodiments.

FIG. 2 is an exemplary diagram showing overlapping precursor ion transmission windows 200 in a sequential windowed acquisition experiment where similar compounds are in adjacent windows, in accordance with various embodiments. Similar compounds 210 and 220 are separated by 18 Da.

Compound 220, for example, differs from compound 210 only by an in-source loss of a water ion.

FIG. 2 shows two cycles of an overlapping SWATH™ experiment. In both cycles the precursor ion transmission windows are 25 Da wide. In cycle 2 the transmission windows are shifted by 12.5 Da creating a 12.5 Da overlap between windows in each of the two cycles. This overlap enables demultiplexing of the signal into effective windows that are 12.5 Da wide.

For example, the overlap of 12.5 Da portion 211 of window 215 in cycle 1 and 12.5 Da portion 222 of window 224 in cycle 2 can be demultiplexed into an effective 12.5 Da precursor ion transmission window. Essentially, demultiplexing this 12.5 window involves adding window 224 and window 215 and then subtracting window 214 and window 225 from the sum. To prevent left over signal from measurement variation of intense peaks, it is common to subtract contributions from window 214 and window 225 more than once from the sum.

However, as described above, a problem with this technique is that when similar compounds are in adjacent windows, the resulting fragments are subtracted from both (all) demultiplexed windows. FIG. 2 includes compound 210 and similar compound 220 in adjacent windows 224 and 225, for example.

Figure 3:
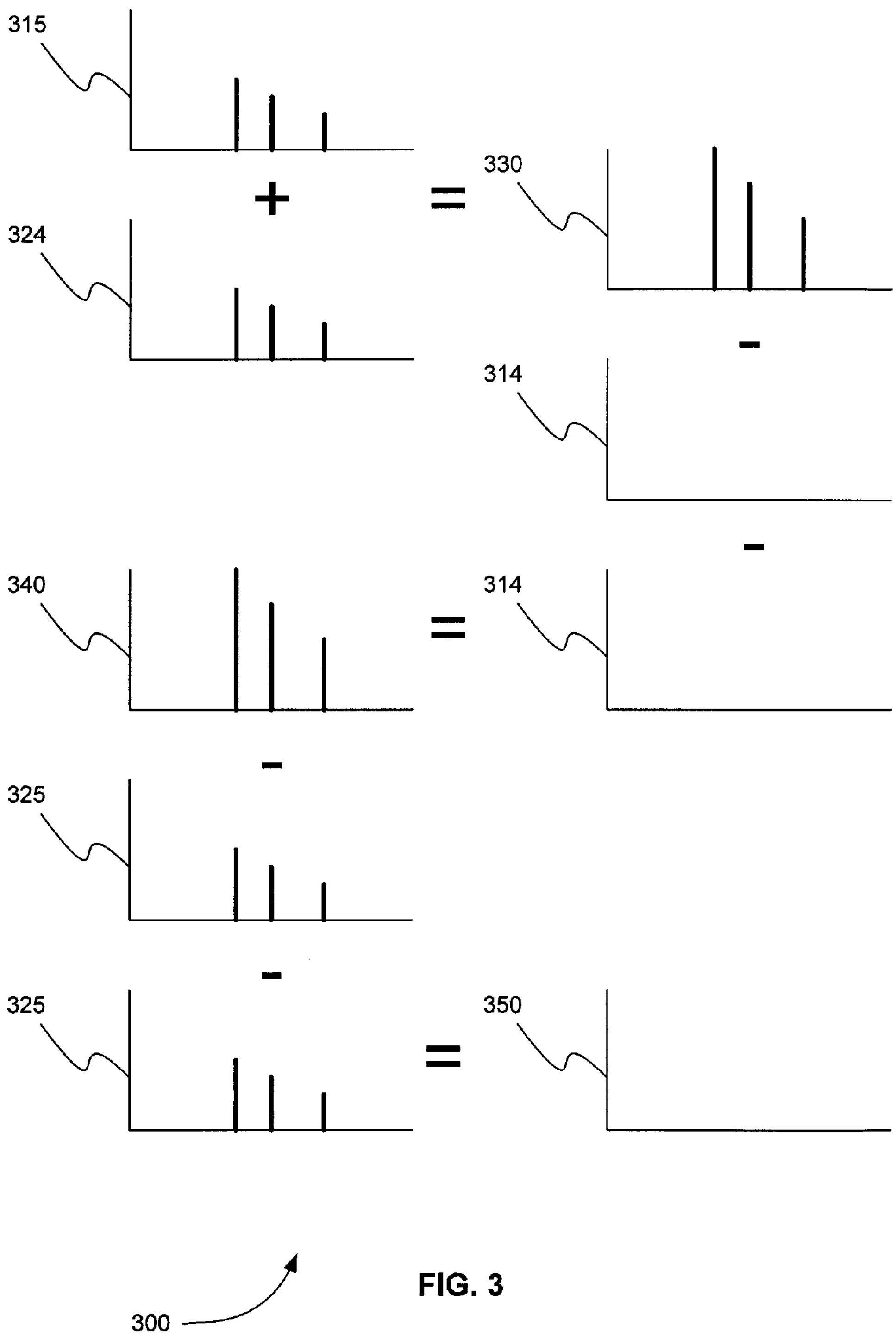
FIG. 3 is an exemplary diagram showing the demultiplexing of product ion spectra corresponding to the precursor ion transmission windows of FIG. 2, in accordance with various embodiments.

FIG. 3 is an exemplary diagram showing the demultiplexing of product ion spectra 300 corresponding to precursor ion transmission windows 214, 215, 224, and 225 of FIG. 2, in accordance with various embodiments. Product ion spectrum 315 is produced from precursor ion transmission window 215 of FIG. 2, and product ion spectrum 324 is produced from precursor ion transmission window 224 of FIG. 2. Demultiplexing begins by adding overlapping related scans together. Product ion spectrum 315 and product ion spectrum 324 of FIG. 3 are added. Both product ion spectrum 315 and product ion spectrum 324 include product ions produced from the fragmentation of precursor ion 220 in FIG. 2.

Product ion spectrum 330 in FIG. 3 is the sum of product ion spectrum 315 and product ion spectrum 324. Product ion spectrum 330 shows that the intensities of common product ions of product ion spectrum 315 and product ion spectrum 324 have essentially doubled. However, other product ions not shared by product ion spectrum 315 and product ion spectrum 324 (which are not shown) are not doubled.

In the next demultiplexing step, unrelated scans from adjacent cycles are subtracted from summed product ion spectrum. More specifically, in order to remove contributions from product ions produced from precursor ions in 12.5 Da portion 212 of window 215 in cycle 1 and from product ions in 12.5 Da portion 221 of window 224 in cycle 2 shown in FIG. 2, product ions produced from precursor ions in unrelated and overlapping precursor windows 225 and 214, respectively, of FIG. 2 are subtracted from summed spectrum 330 of FIG. 3. As described above, to prevent left over signal from measurement variation of intense peaks, it is common to subtract the product ions produced from window 214 and window 225 more than once from the sum.

Product ion spectrum 314 is produced from precursor ion transmission window 214 of FIG. 2, and product ion spectrum 325 is produced from precursor ion transmission window 225 of FIG. 2. In FIG. 3, product ion spectrum 314 is subtracted twice from summed product ion spectrum 330 producing product ion spectrum 340. Since product ion 314 does not contain any ions in common with summed product ion spectrum 330, product ion spectrum 340 still includes the product ions of compound 220.

Product ion spectrum 325 is then subtracted twice from product ion spectrum 340 producing product ion spectrum 350. Product ion spectrum 325, however, includes product ions produced from fragmentation of compound 210 of FIG. 2. Since compounds 220 and 210 of FIG. 2 are similar compounds, their fragmentation patterns are almost identical. In other words, the product ions shown in product ion spectrum 325 of FIG. 3 are almost identical to the common ions shown in product ion spectrum 340. As a result, the subtraction of product ion spectrum 325 twice from product ion spectrum 340 effectively removes the product ions of compound 220 of FIG. 2 from resultant demultiplexed product ion spectrum 350.

Similarly, the product ions of compound 210 of FIG. 2 are removed from a demultiplexed 12.5 Da window produced from precursor ions in 12.5 Da portion 227 of window 225 in cycle 2 and from precursor ions in 12.5 Da portion 217 of window 216 in cycle 1 shown in FIG. 2. Therefore the subtraction of the overlapping windows results in the loss of fragments produced from similar compounds in adjacent windows from all demultiplexed windows.

Product ion spectra 315, 324, 330, 340, 314, 350, and 325 of FIG. 3 depict only the product ions produced from compounds 210 and 220 of FIG. 2 in order to more clearly show how these product ions can be affected by demultiplexing. One skilled in the art, however, can appreciate that product ion spectra 315, 324, 330, 340, 314, 350, and 325 of FIG. 3 can include other product ions. Similarly, precursor ion transmission windows 215, 216, 224, and 225 in FIG. 2 depict only the precursor ions for compounds 210 and 220 in order to more clearly show how these precursor ions can be affected by demultiplexing. One skilled in the art, however, can appreciate that transmission windows 215, 216, 224, and 225 in FIG. 2 can include other precursor ions.

Also as described above, another problem affecting data quality is that the demultiplexing assumes square Q1 transmission windows, and it assumes that fragments are a result of compounds spread equally across this Q1 window.

Faster, more sensitive instruments can acquire the narrower SWATH™ windows directly. However, demultiplexing combined with faster, more sensitive instruments can then achieve even narrower windows that still have same problems affecting data quality.

In various embodiments, methods and systems provide improved data quality after demultiplexing of overlapped acquisition windows.

In various embodiments, after signals have been demultiplexed, methods and systems reconstruct the original acquisition windows by summing adjacent demultiplexed windows together. For example, demultiplexed product ion spectra for 12.5 Da portion 211 and 12.5 Da portion 212 can be added together to try and reconstruct the original product ion spectrum (315 of FIG. 3) for precursor ion transmission window 215. However, shared fragments (220 of FIG. 2) will be missing from this reconstructed spectrum.

In various embodiments, methods and systems identify missing ions by comparing the reconstructed spectrum to the original acquired spectrum (subtraction of the two). For example, the sum of the product ion spectrum for 12.5 Da portion 211 and product ion spectrum 12.5 Da portion 212 is compared to the original product ion spectrum (315 of FIG. 3) for precursor ion transmission window 215. Any missing signals can then be added back to the demultiplexed windows to achieve a more accurate representation of the fragmentation spectrum for that window.

In various embodiments, methods and systems also provide weighting of spectrum based on the shape of transmission windows or absences of precursor signals. As noted above, demultiplexing assumes square transmission windows and that fragments are a result of compounds spread equally across this window, which are not true. In various embodiments, the actual shape of the transmission window may be used to weight the resulting spectrum. When this spectrum is used for demultiplexing (either for addition or subtraction) its value may be weighted based on how likely the fragments detected in this spectrum are related to the region trying to be enhanced by demultiplexing.

Similarly, the full scan time-of-flight mass spectrometry (TOFMS or MS1) experiment may be used to determine whether any precursor ions exist in the region of interest (being used for adding or subtracting of a spectrum to demultiplex). Based on this TOFMS evidence of the Q1 region, the spectrum may be weighted differently for use in demultiplexing.

In various embodiments, missing ions are identified after demultiplexing using PeakView® plugins to rewrite a proprietary file, such as an AB Sciex TripleTOF® and QTRAP® instrument (WIFF) file, with the processed version. Alternatively, missing ions can be identified after demultiplexing during acquisition.

In various embodiments, methods and systems solve a potential drawback to using demultiplexing to achieve narrower windows, and provide benefits to high resolution instruments.

In various embodiments, methods and systems enable mass spectrometer instrument customers to obtain high quality MS/MS spectra, with better specificity (e.g., narrower Q1 windows).

System for Identifying Missing Product Ions after Demultiplexing

Figure 4:
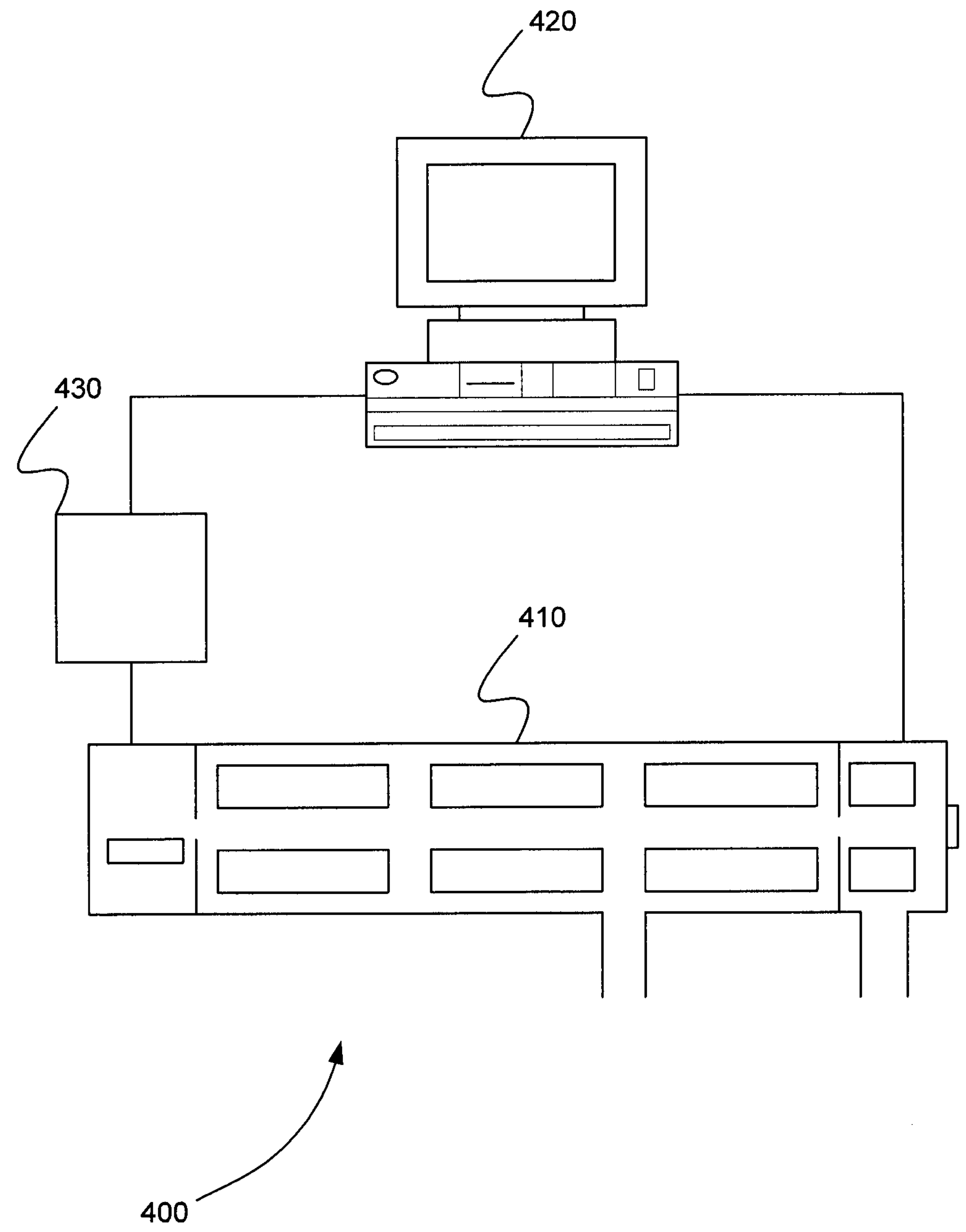
FIG. 4 is a schematic diagram showing a system for identifying missing product ions after demultiplexing product ion spectra produced by overlapping precursor ion transmission windows in sequential windowed acquisition tandem mass spectrometry, in accordance with various embodiments.

FIG. 4 is a schematic diagram showing a system 400 for identifying missing product ions after demultiplexing product ion spectra produced by overlapping precursor ion transmission windows in sequential windowed acquisition tandem mass spectrometry, in accordance with various embodiments. System 400 includes tandem mass spectrometer 410 and processor 420. In various embodiments, system 400 can also include separation device 430.

Tandem mass spectrometer 410 can include one or more physical mass filters and one or more physical mass analyzers. A mass analyzer of a tandem mass spectrometer can include, but is not limited to, a time-of-flight (TOF), quadrupole, an ion trap, a linear ion trap, an orbitrap, or a Fourier transform mass analyzer.

Tandem mass spectrometer 410 performs overlapping sequential windowed acquisition on a sample. On each cycle, tandem mass spectrometer 410 steps a precursor mass window across a mass range, fragments transmitted precursor ions of each stepped precursor mass window, and analyzes product ions produced from the fragmented transmitted precursor ions. Between at least two cycles, tandem mass spectrometer 410 shifts the stepped precursor mass window to produce overlapping mass windows between the at least two cycles. The overlapping sequential windowed acquisition produces a product ion spectrum for each stepped precursor mass window for each cycle of the at least two cycles.

Processor 420 can be, but is not limited to, a computer, microprocessor, or any device capable of sending and receiving control signals and data from mass spectrometer 410 and processing data. Processor 420 is in communication with tandem mass spectrometer 410.

Processor 420 receives a plurality of overlapping stepped precursor mass windows and their corresponding product ion spectra for the at least two cycles from tandem mass spectrometer 410. Processor 420 selects a first precursor mass window and the corresponding first product ion spectrum from the plurality of overlapping stepped precursor mass windows and their corresponding product ion spectra. Processor 420 demultiplexes a product ion spectrum for each overlapped portion of the first precursor mass window producing two or more demultiplexed first product ion spectra for the first precursor mass window.

For example, for each overlapped portion of the first precursor mass window, processor 420 (*a*) adds the first product ion spectrum and a product ion spectrum of an overlapping precursor mass window producing a summed product ion spectrum and (b) subtracts product ion spectra of two or more precursor mass windows adjacent to the first precursor mass window and the overlapping precursor mass window that overlap with non-overlapping portions of the first precursor mass window and the overlapping precursor mass window from the summed product ion spectrum one or more times.

Processor 420 adds the two or more demultiplexed first product ion spectra together producing a reconstructed summed demultiplexed first product ion spectrum.

Finally, processor 420 identifies missing product ions in the summed demultiplexed first product ion spectrum by comparing the summed demultiplexed first product ion spectrum and the first product ion spectrum.

In various embodiments, processor 420 compares the summed demultiplexed first product ion spectrum and the first product ion spectrum by subtracting the summed demultiplexed first product ion spectrum from the first product ion spectrum.

In various embodiments, processor 420 further adds one or more missing product ions of the identified missing product ions back to one or more product ion spectra of the two or more demultiplexed first product ion spectra to improve the data quality of the one or more product ion spectra.

In various embodiments, processor 420 further applies shape weightings to each product ion spectrum corresponding to each stepped precursor mass window of the plurality of overlapping stepped precursor mass windows based on the shape of each stepped precursor mass window.

In various embodiments, processor 420 further uses shape weightings assigned to the first product ion spectrum, the product ion spectrum of an overlapping precursor mass window, and the product ion spectra of two or more precursor mass windows adjacent to the first precursor mass window and the overlapping precursor mass window that overlap with non-overlapping portions of the first precursor mass window and the overlapping precursor mass in steps (a) and (b) of the demultiplexing step described above.

In various embodiments, processor 420 further receives from the tandem mass spectrometer a precursor spectrum for each stepped precursor mass windows of the plurality of overlapping stepped precursor mass windows and applies precursor ion weightings to each product ion spectrum corresponding to each stepped precursor mass window of the plurality of overlapping stepped precursor mass windows based on whether any precursor ions exist in each stepped precursor mass window.

In various embodiments, processor 420 further uses precursor ion weightings assigned to the first product ion spectrum, the product ion spectrum of an overlapping precursor mass window, and the product ion spectra of two or more precursor mass windows adjacent to the first precursor mass window and the overlapping precursor mass window that overlap with non-overlapping portions of the first precursor mass window and the overlapping precursor mass in steps (a) and (b) of the demultiplexing step described above.

Tandem mass spectrometer 410 can also include a separation device 430. Separation device 430 can perform a separation technique that includes, but is not limited to, liquid chromatography, gas chromatography, capillary electrophoresis, or ion mobility. Tandem mass spectrometer 410 can include separating mass spectrometry stages or steps in space or time, respectively. Separation device 430 separates the sample from a mixture, for example. In various embodiments, separation device 430 comprises a liquid chromatography device and a product ion spectrum for each stepped precursor mass window is acquired within a liquid chromatography (LC) cycle time.

Method for Identifying Missing Product Ions after Demultiplexing

Figure 5:
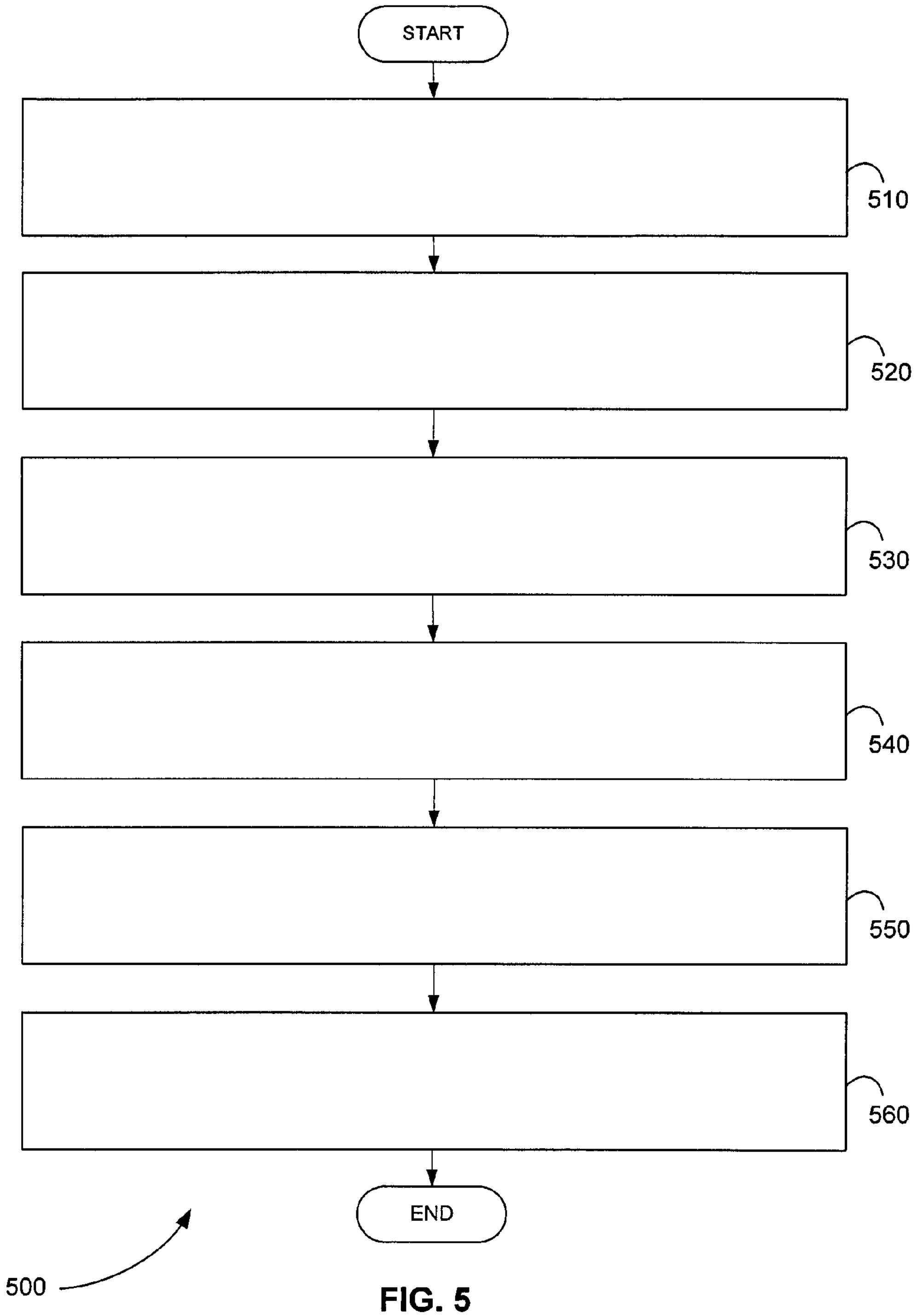
FIG. 5 is an exemplary flowchart showing a method for identifying missing product ions after demultiplexing product ion spectra produced by overlapping precursor ion transmission windows in sequential windowed acquisition tandem mass spectrometry, in accordance with various embodiments.

FIG. 5 is an exemplary flowchart showing a method 500 for identifying missing product ions after demultiplexing product ion spectra produced by overlapping precursor ion transmission windows in sequential windowed acquisition tandem mass spectrometry, in accordance with various embodiments.

In step 510 of method 500, overlapping sequential windowed acquisition is performed on a sample using a tandem mass spectrometer. For each cycle, the tandem mass spectrometer steps a precursor mass window across a mass range, fragments transmitted precursor ions of each stepped precursor mass window, and analyzes product ions produced from the fragmented transmitted precursor ions. Between at least two cycles, the tandem mass spectrometer shifts the stepped precursor mass window to produce overlapping mass windows between the at least two cycles. The overlapping sequential windowed acquisition produces a product ion spectrum for each stepped precursor mass window for each cycle of the at least two cycles.

In step 520, a plurality of overlapping stepped precursor mass windows and their corresponding product ion spectra are received for the at least two cycles from the tandem mass spectrometer using a processor.

In step 530, a first precursor mass window and the corresponding first product ion spectrum are selected from the plurality of overlapping stepped precursor mass windows and their corresponding product ion spectra using the processor.

In step 540, a product ion spectrum is demultiplexed for each overlapped portion of the first precursor mass window producing two or more demultiplexed first product ion spectra for the first precursor mass window using the processor. For example, the first product ion spectrum and a product ion spectrum of an overlapping precursor mass window are added producing a summed product ion spectrum. Then, product ion spectra of two or more precursor mass windows adjacent to the first precursor mass window and the overlapping precursor mass window that overlap with non-overlapping portions of the first precursor mass window and the overlapping precursor mass are subtracted from the summed product ion spectrum one or more times. To prevent left over signal from measurement variation of intense peaks, it is common to subtract these product ion spectra more than once from the sum.

In step 550, the two or more demultiplexed first product ion spectra are added together producing a reconstructed summed demultiplexed first product ion spectrum using the processor.

In step 560, missing product ions are identified in the summed demultiplexed first product ion spectrum by comparing the summed demultiplexed first product ion spectrum and the first product ion spectrum using the processor.

Computer Program Product for Identifying Missing Product Ions after Demultiplexing In various embodiments, a computer program product includes a tangible computer-readable storage medium whose contents include a program with instructions being executed on a processor so as to perform a method for identifying missing product ions after demultiplexing product ion spectra produced by overlapping precursor ion transmission windows in sequential windowed acquisition tandem mass spectrometry. This method is performed by a system that includes one or more distinct software modules.

Figure 6:
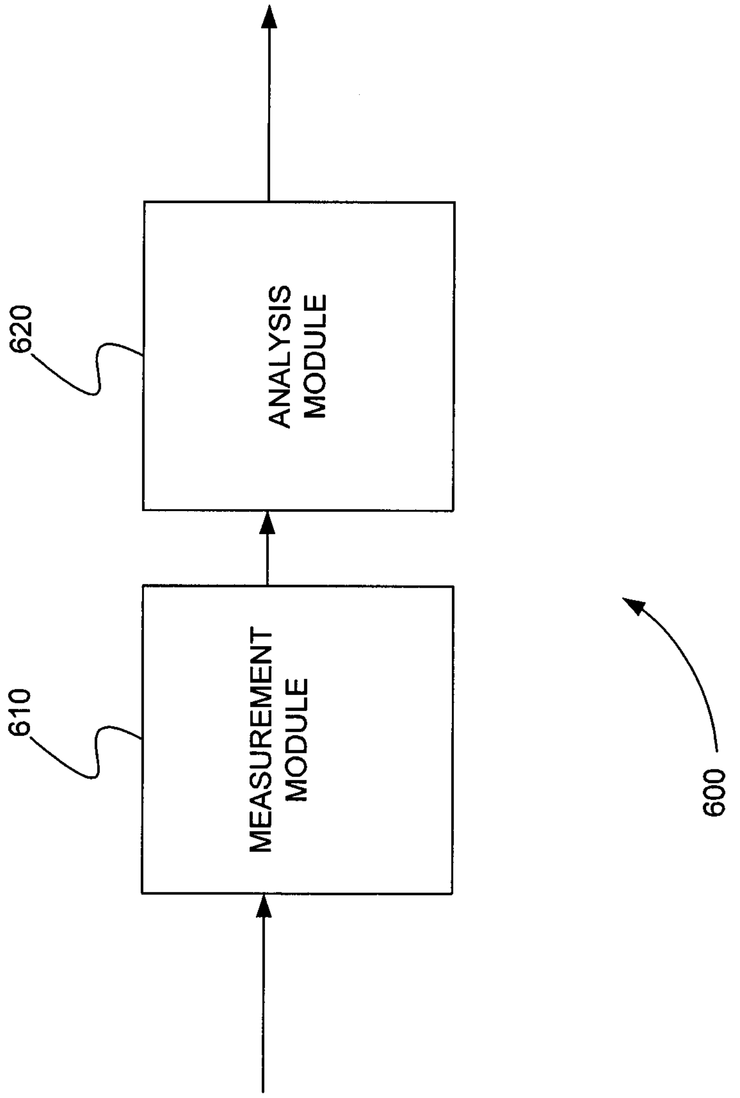
FIG. 6 is a schematic diagram of a system that includes one or more distinct software modules that performs a method for identifying missing product ions after demultiplexing product ion spectra produced by overlapping precursor ion transmission windows in sequential windowed acquisition tandem mass spectrometry, in accordance with various embodiments.

FIG. 6 is a schematic diagram of a system 600 that includes one or more distinct software modules that performs a method for identifying missing product ions after demultiplexing product ion spectra produced by overlapping precursor ion transmission windows in sequential windowed acquisition tandem mass spectrometry, in accordance with various embodiments. System 600 includes measurement module 610 and analysis module 620.

Measurement module 610 receives a plurality of overlapping stepped precursor mass windows and their corresponding product ion spectra for the at least two cycles from a tandem mass spectrometer. The tandem mass spectrometer performs overlapping sequential windowed acquisition on a sample. For each cycle, the tandem mass spectrometer steps a precursor mass window across a mass range, fragments transmitted precursor ions of each stepped precursor mass window, and analyzes product ions produced from the fragmented transmitted precursor ions. Between at least two cycles, the tandem mass spectrometer shifts the stepped precursor mass window to produce overlapping mass windows between the at least two cycles. The overlapping sequential windowed acquisition produces a product ion spectrum for each stepped precursor mass window for each cycle of the at least two cycles.

Analysis module 620 selects a first precursor mass window and the corresponding first product ion spectrum from the plurality of overlapping stepped precursor mass windows and their corresponding product ion spectra.

Analysis module 620 demultiplexes a product ion spectrum for each overlapped portion of the first precursor mass window producing two or more demultiplexed first product ion spectra for the first precursor mass window. For example, the first product ion spectrum and a product ion spectrum of an overlapping precursor mass window are added producing a summed product ion spectrum. Then, product ion spectra of two or more precursor mass windows adjacent to the first precursor mass window and the overlapping precursor mass window that overlap with non-overlapping portions of the first precursor mass window and the overlapping precursor mass are subtracted from the summed product ion spectrum one or more times. To prevent left over signal from measurement variation of intense peaks, it is common to subtract these product ion spectra more than once from the sum.

Analysis module 620 adds the two or more demultiplexed first product ion spectra together producing a reconstructed summed demultiplexed first product ion spectrum. Analysis module 620 identifies missing product ions in the summed demultiplexed first product ion spectrum by comparing the summed demultiplexed first product ion spectrum and the first product ion spectrum.

Data Examples

The ability to acquire all possible mass spectrometry/mass spectrometry (MS/MS) fragments during each cycle of data acquisition has radically changed peptide quantitation capabilities. Since no prior information is required, data acquisition is greatly simplified. During data processing, the particulars of which peptides and proteins are studied can be changed at any time, without the need for reacquiring any data. In the case of sequential windowed acquisition (SWATH™), the acquisition technique utilizes wide Q1 isolation combined with high resolution time-of-flight (TOF) analysis to provide selectivity comparable to unit resolution selected reaction monitoring (SRM). SWATH™ is a trade-off between the width of isolation and cycle time (i.e., points across a liquid chromatography (LC) peak).

The use of overlapping SWATH™ windows can improve the cycle time and reduce the SWATH™ window size. SWATH™ is described herein for illustration purposes. One skilled in the art will appreciate that other types of mass spectrometry techniques can equally be applied.

Acquisition window width has an effect on selectivity and cycle time. Wider windows are less selective but provide faster cycle times. Narrow windows are more selective, but at the expense of longer cycle times. By overlapping acquisition windows it is possible to extract which fragments belonged to which precursor mass range.

In an experiment, initial experiments were performed by infusing a mixture of casein peptide digest. The SWATH™ window that covers 675-700 mass-to-charge (m/z) precursors included a dominant peptide at 692 m/z as well as a lower intensity peptide at 684 m/z. The resulting spectrum has fragments primarily from the dominant 692 peptide. The same mixture was acquired again, but this time with SWATH™ windows that were shifted by 5 Da each cycle (675-700 Da in the first cycle, 680-705 Da in the second cycle, and so on). This data was deconvoluted using a system of equations to enhance the region of interest, for example. The 684 m/z peptide fragmentation pattern was easily distinguished from the 692 m/z peptide, demonstrating close to 5 Da windows of resolution. The above example is described for illustration purposes. One skilled in the art will appreciate that different m/z precursors and different windows of resolution can equally be used.

In another experiment, a similar acquisition and processing strategy was applied to an *E. Coli.* digest separated by nano LC. In this experiment, 25 Da windows were deconvoluted to ~8 Da windows, generating separate MS/MS for co-eluting peptides of similar m/z. Extracted ion chromatograms (XIC) demonstrated the improved selectivity, signal-to-noise (S/N) ratio, and comparable cycle time of the deconvoluted narrower SWATH™ windows. In this experiment, a large scale peptide detection methodology was applied, utilizing over 1000 peptide targets and multiple fragment ions per peptide. False discovery rate analysis demonstrated that significantly more peptides were detected by using deconvolution of overlapping windows to generate narrower windows.

In yet another experiment, the same technique was applied to the detection of a small molecule compound. In this experiment, the compounds 3,4-methylenedioxy-N-methylamphetamine (MDMA) and 3,4-methylenedioxy-N-ethylamphetamine (MDEA) are separated by 14 Da. Traditional SWATH™ acquisition resulted in both compounds being detected in the same window, making retention time a key criterion for identification. The deconvoluted data separated the two compounds into individual windows, producing only one significant chromatographic peak in each XIC.

In various embodiments, methods and systems use overlapping windows to generate MS/MS data from apparently narrower Q1 windows, and measure the effect of narrower windows on qualitative and quantitative properties for peptide and small molecule detection.

In various embodiments, data is collected using, for example, a research version of Analyst TF 1.6 that allows for control of the overlap between the subsequent SWATH™ windows. Analyst TF 1.6 is described herein for illustration purposes. One skilled in the art will appreciate that other software tools can equally be used.

In various embodiments, peptide digest samples are injected and eluted from, for example, an Eksigent NanoLC™ 2D Plus system at a flow rate of 200 nl·min-1. The gradient used for the elution of the material dependents upon the complexity of the sample injected. Eksigent NanoLC™ 2D Plus system is described herein for illustration purposes. One skilled in the art will appreciate that other separation devices can equally be used.

In various embodiments, small molecule samples are analysed using, for example, a Shimadzu Prominence UFLC system operated at 400 uL/min, using a gradient from 90% of mobile phase A (water/acetonitrile (95/5 (v/v))+0.1% formic acid) to 80% of B (water/acetonitrile (5/95 (v/v))+ 0.1% formic acid) over 5 minute, for example. The column oven is operated at 40° C., for example. A Luna Kinetex C18 (2×50 mm, 2.6 u) column from Phenomenex (Torrance, Calif.) is used with an injection volume of 10 uL, for example. Shimadzu Prominence UFLC system and the operation conditions are described herein for illustration purposes. One skilled in the art will appreciate that other analysis systems and operation conditions can equally be used.

In various embodiments, the data is processed using, for example, PeakView™ 1.2 software with a research plug-in that performs the reconstruction of the narrow windows. PeakView™ 1.2 software is described herein for illustration purposes. One skilled in the art will appreciate that other software tools can equally be used.

Results of Experiments

Figure 7:
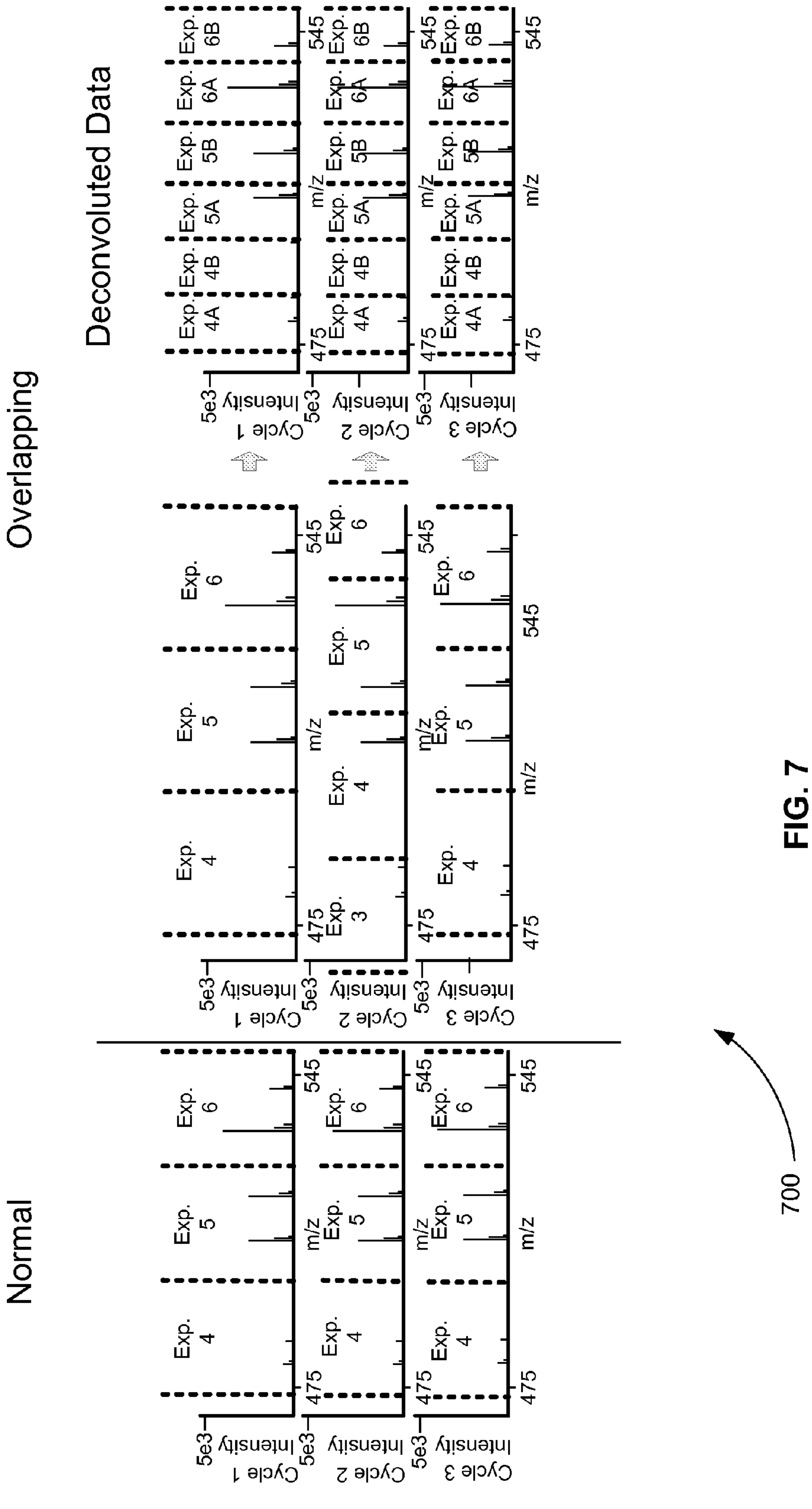
FIG. 7 illustrates exemplary plots showing deconvolution of overlapping SWATH™ windows, in accordance with various embodiments.

FIG. 7 illustrates exemplary plots 700 showing deconvolution of overlapping SWATH™ windows, in accordance with various embodiments.

During normal SWATH™ acquisition, the entire mass range is covered with moderately wide Q1 isolation windows. In each cycle, the same windows are acquired. The size an accumulation time for each window is chosen in order to cover the desired mass range in a time suitable to measure an adequate number of points across an LC peak.

In various embodiments, with overlapping SWATH™ acquisition, the same size windows are acquired in each cycle. However, each cycle introduces a shift in the position of the windows. An example of a shift of half a window is shown in FIG. 7.

In various embodiments, spectra from overlapping regions are used to create a data file where spectral data from each deconvoluted window is saved in a separate experiment.

Figure 8:
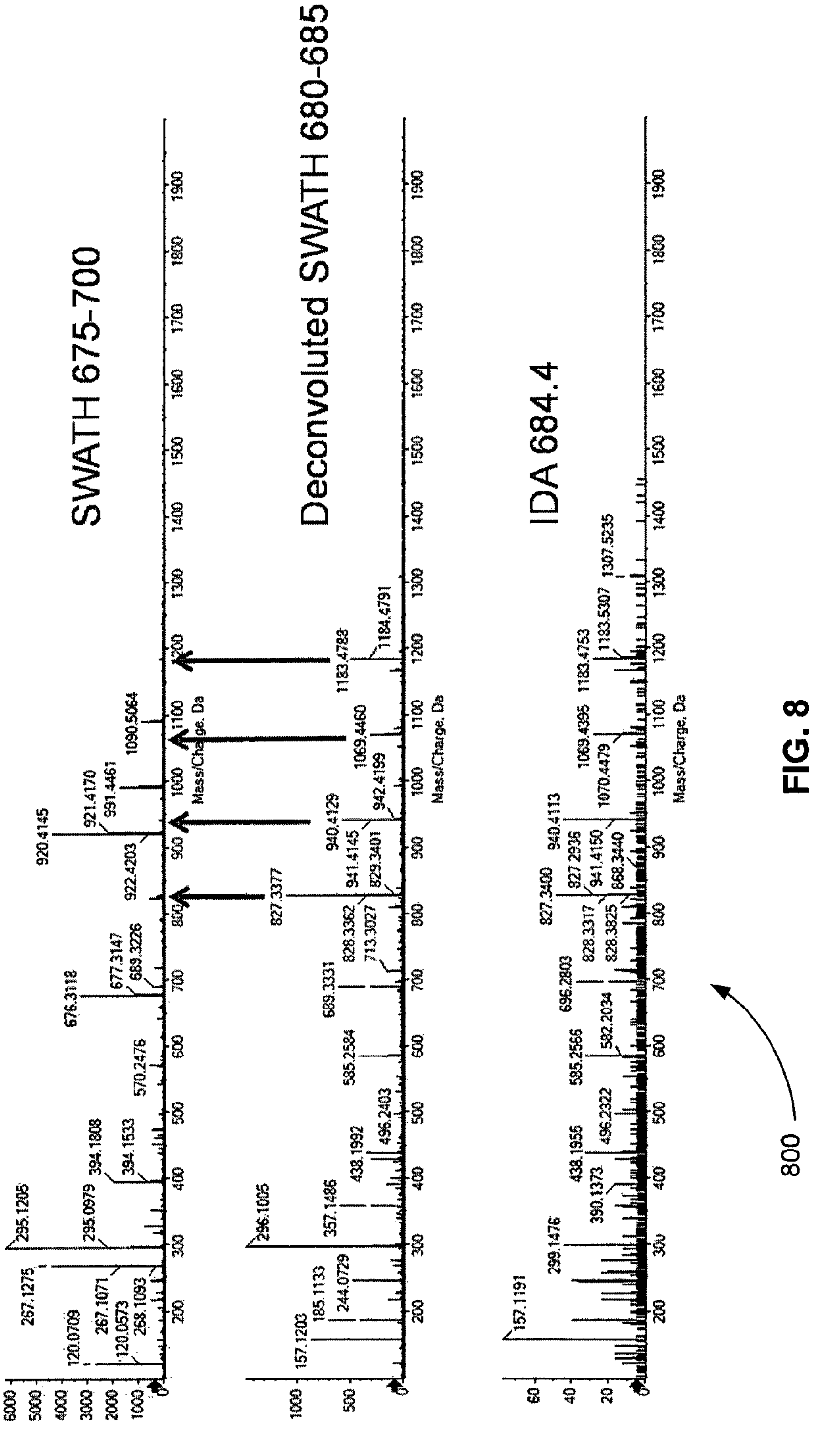
FIG. 8 illustrates exemplary plots showing an example from infusion of casein digest mixture, in accordance with various embodiments.

FIG. 8 illustrates exemplary plots 800 showing an example from infusion of casein digest mixture, in accordance with various embodiments.

Referring to FIG. 8, a normal SWATH™ window of 25 Da is dominated by fragmentation from the 692 m/z peptide. Fragments from the 684 m/z peptide are present but difficult to see. After deconvolution of an overlapping SWATH™ acquisition, the 5 Da window (680-685 Da) has removed all interference from the 692 m/z peptide. The remaining fragmentation pattern looks virtually identical to a spectrum acquired from IDA experiment.

Figure 9:
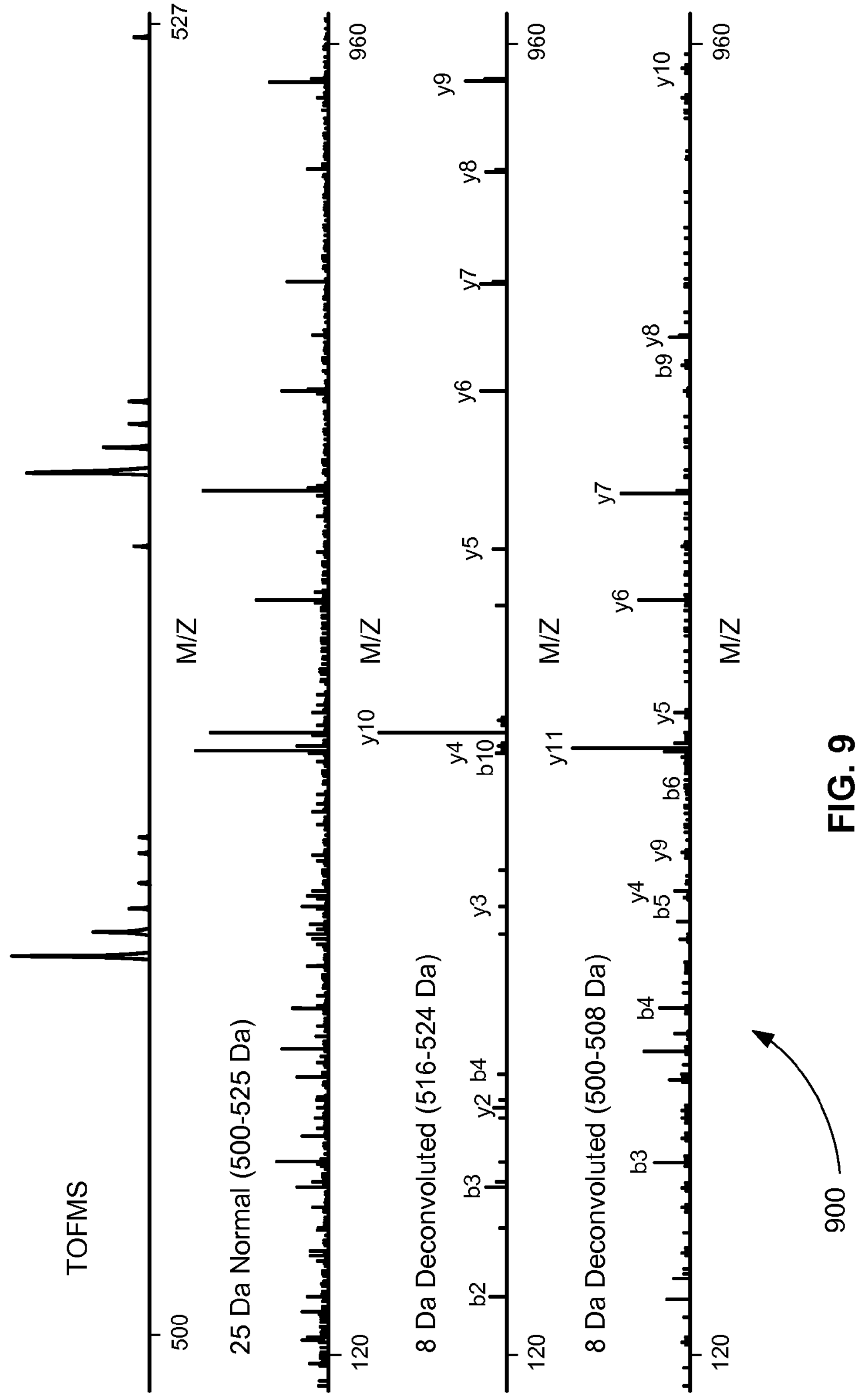
FIG. 9 illustrates exemplary plots showing an example from LC separation of an *E. Coli* protein digest, in accordance with various embodiments.

FIG. 9 illustrates exemplary plots 900 showing an example from LC separation of an *E. Coli* protein digest, in accordance with various embodiments.

During an LC separation of a complex mixture, it is very common to have multiple peptides eluting within a 25 Da SWATH™ window. As shown in FIG. 9, deconvoluted windows of 8 Da in size were able to separate the MS/MS for two co-eluting peptides.

Figure 10:
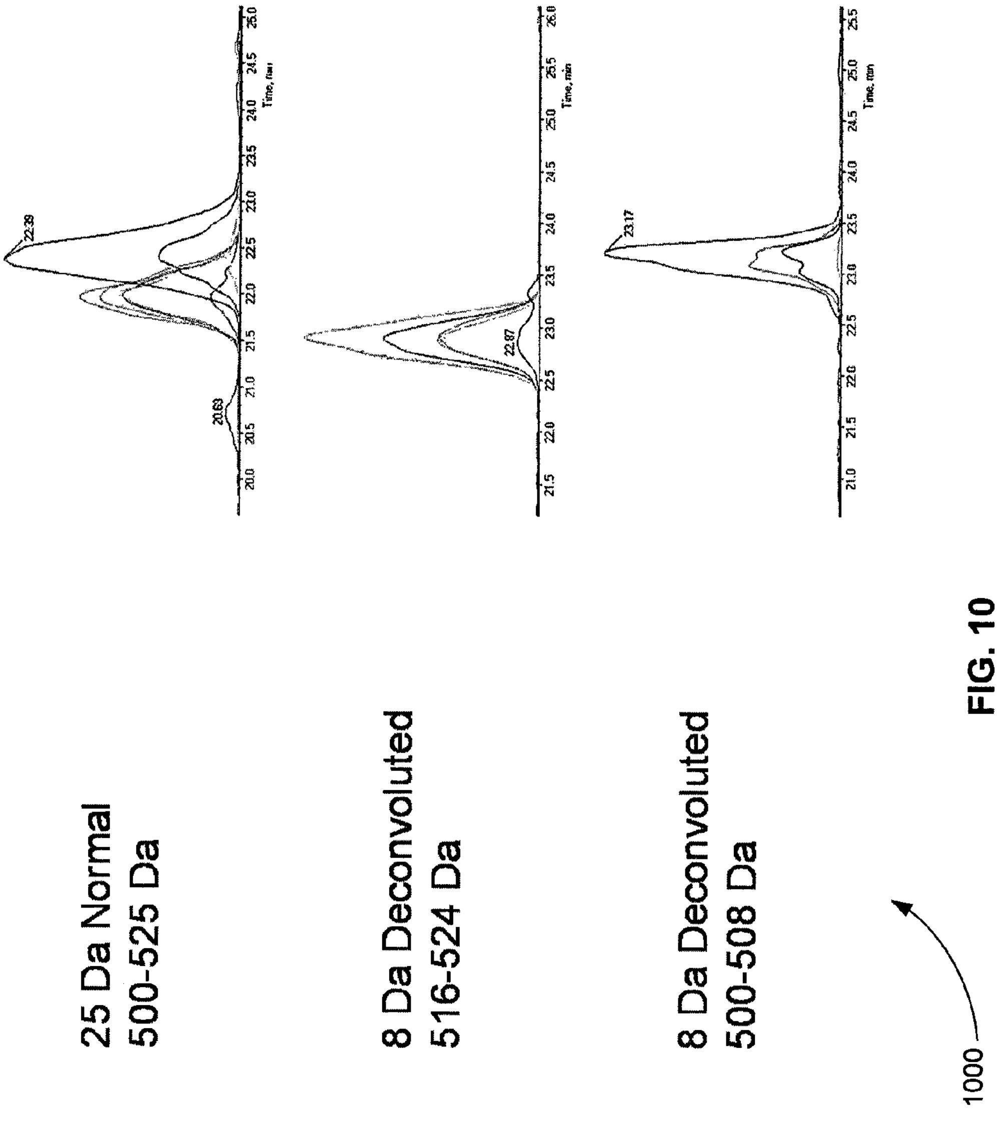
FIG. 10 illustrates exemplary plots showing XIC of multiple fragments, in accordance with various embodiments.

FIG. 10 illustrates exemplary plots 1000 showing XIC of multiple fragments, in accordance with various embodiments.

With 25 Da SWATH™ windows, XIC for several prominent fragment ions show a mixture of two co-eluting peptides. Using the XIC profile it is possible to determine which fragments belong to which peptide. However, this step is not necessary when the data is acquired using overlapping SWATH™ windows. The narrower windows only contained fragment ions from a single peptide.

Figure 11:
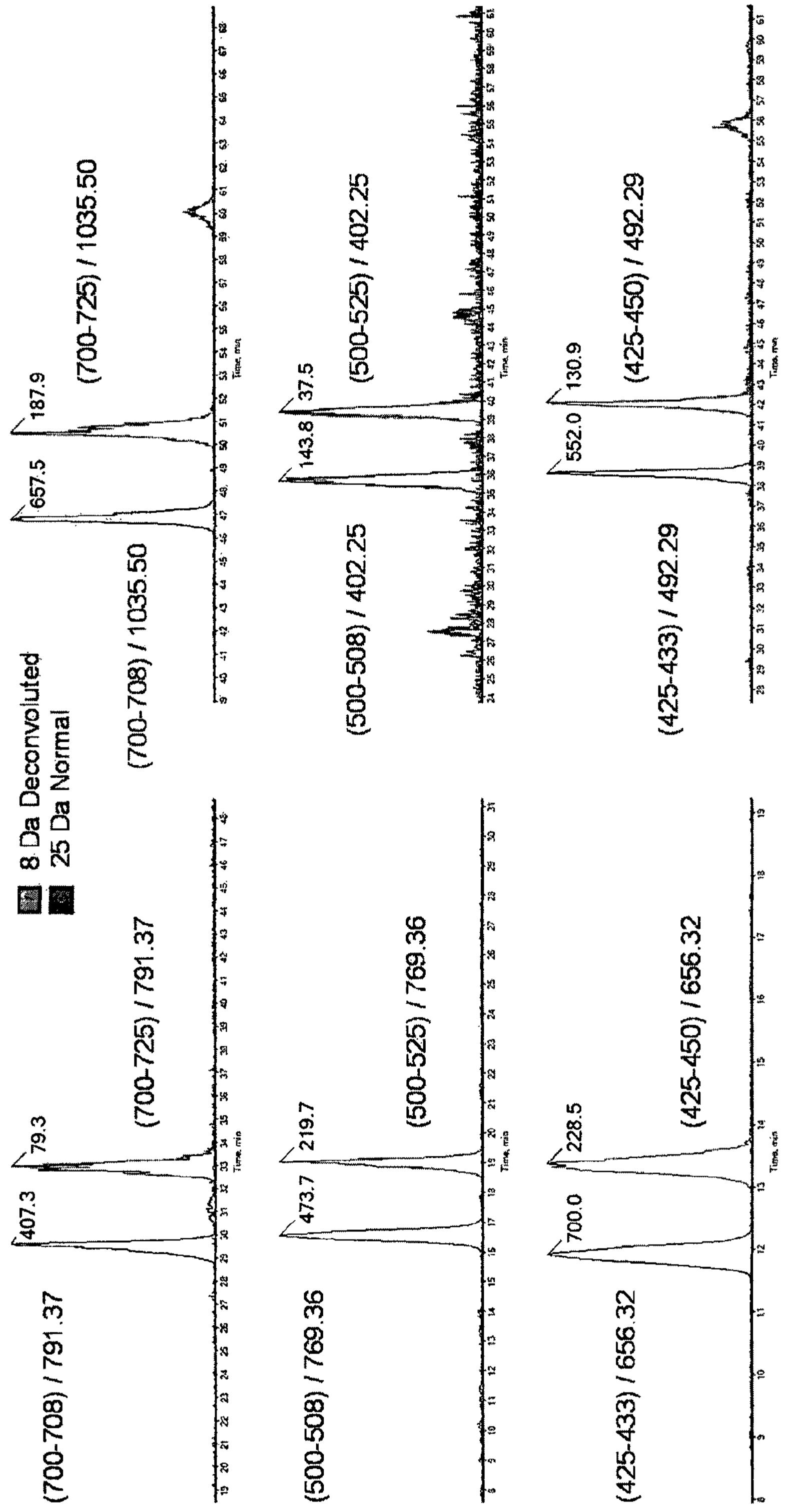
FIG. 11 illustrates exemplary plots showing SN ratio improvements from narrower deconvoluted windows, in accordance with various embodiments.

FIG. 11 illustrates exemplary plots 1100 showing S/N ratio improvements from narrower deconvoluted windows, in accordance with various embodiments.

As shown in FIG. 11, XIC for several peptides are compared for S/N ratio. In all cases, the S/N ratio is improved when data is acquired with overlapping windows, and deconvoluted to narrower windows.

Figure 12:
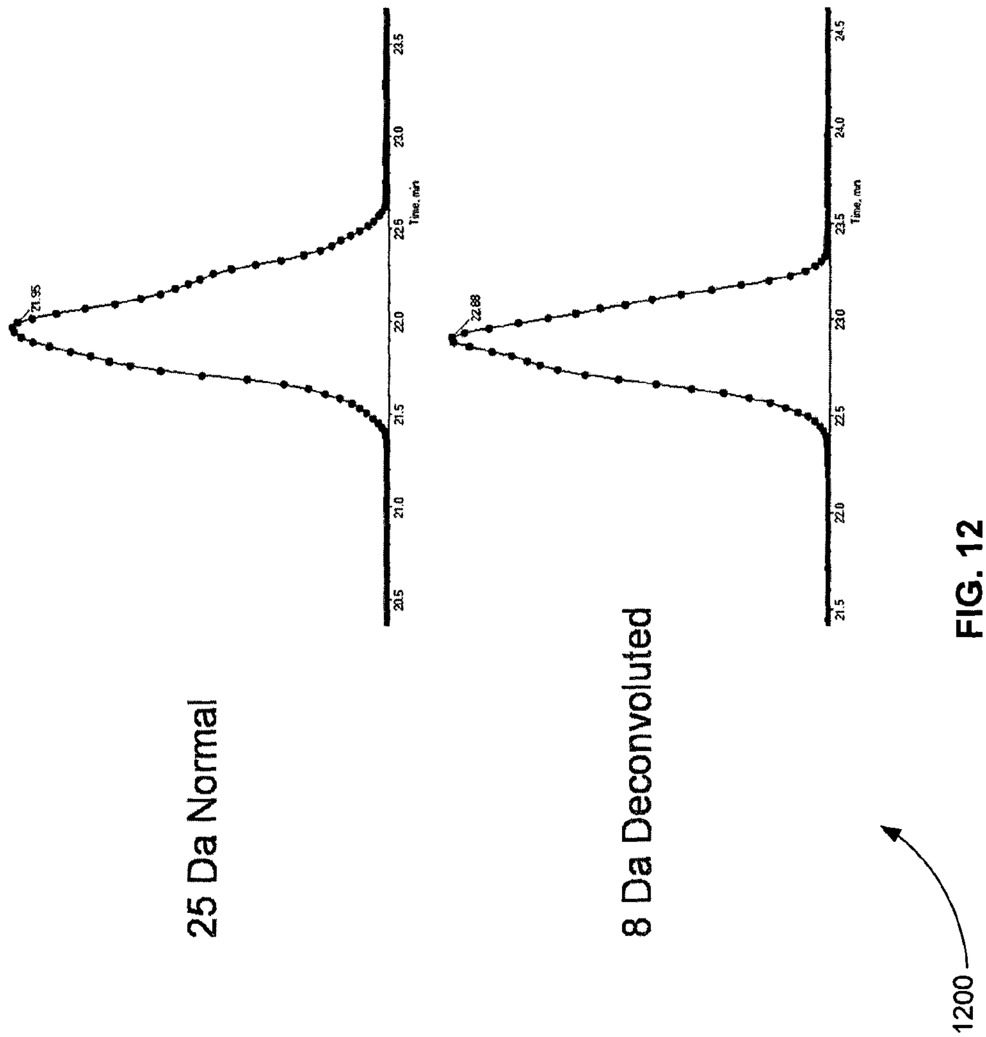
FIG. 12 illustrates exemplary plots showing that equivalent cycle time enables more than enough points across an LC peak, in accordance with various embodiments.

FIG. 12 illustrates exemplary plots 1200 showing that equivalent cycle time enables more than enough points across an LC peak, in accordance with various embodiments.

It is important to maintain a short cycle time, so that an adequate number of points across the LC peak can be obtained. Reducing the window size for normal SWATH™ acquisition would increase the cycle time, and reduce the number of points across the LC peak to unacceptable levels for quantitation.

In various embodiments, by using overlapping windows, the cycle time is identical to normal SWATH™, but the data can be deconvoluted to narrower windows. The benefits of narrower windows can be obtained, while maintaining good cycle times.

Figure 13:
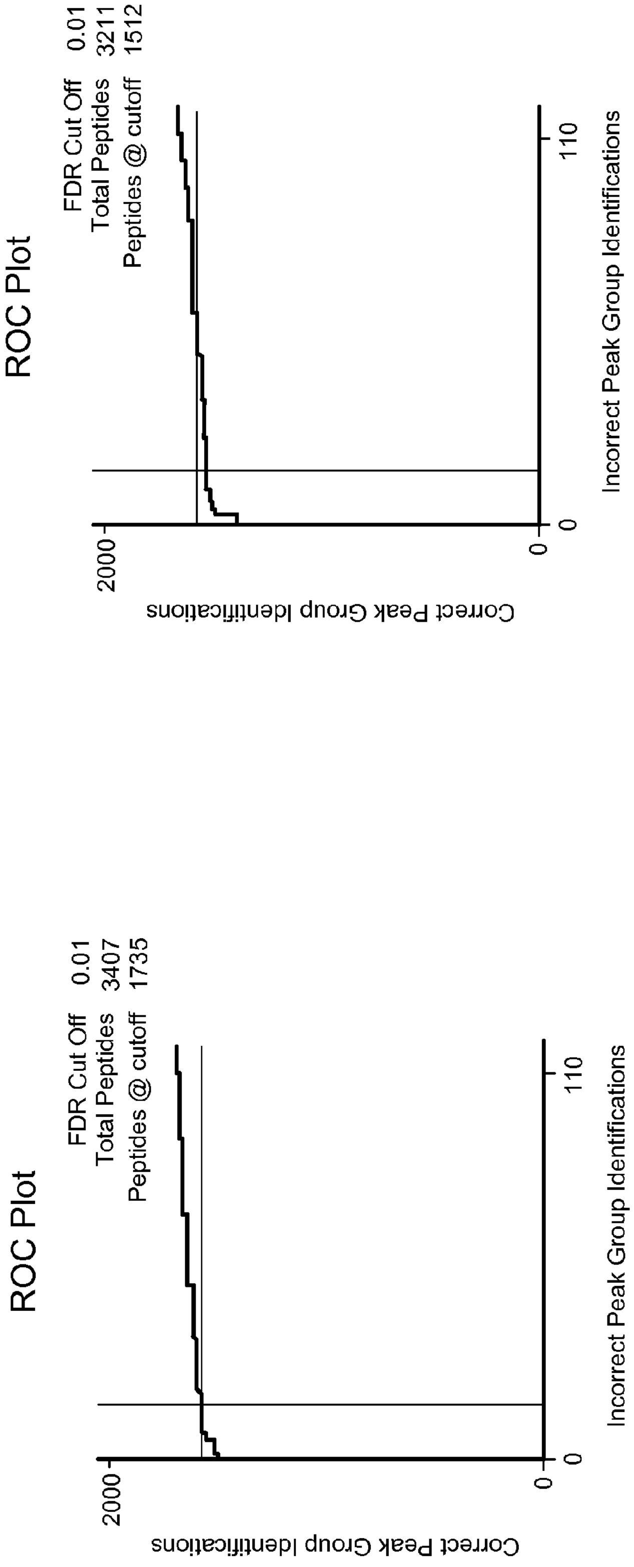
FIG. 13 illustrates exemplary plots showing improved quantitation, in accordance with various embodiments.

FIG. 13 illustrates exemplary plots 1300 showing improved quantitation, in accordance with various embodiments.

Figure 14:
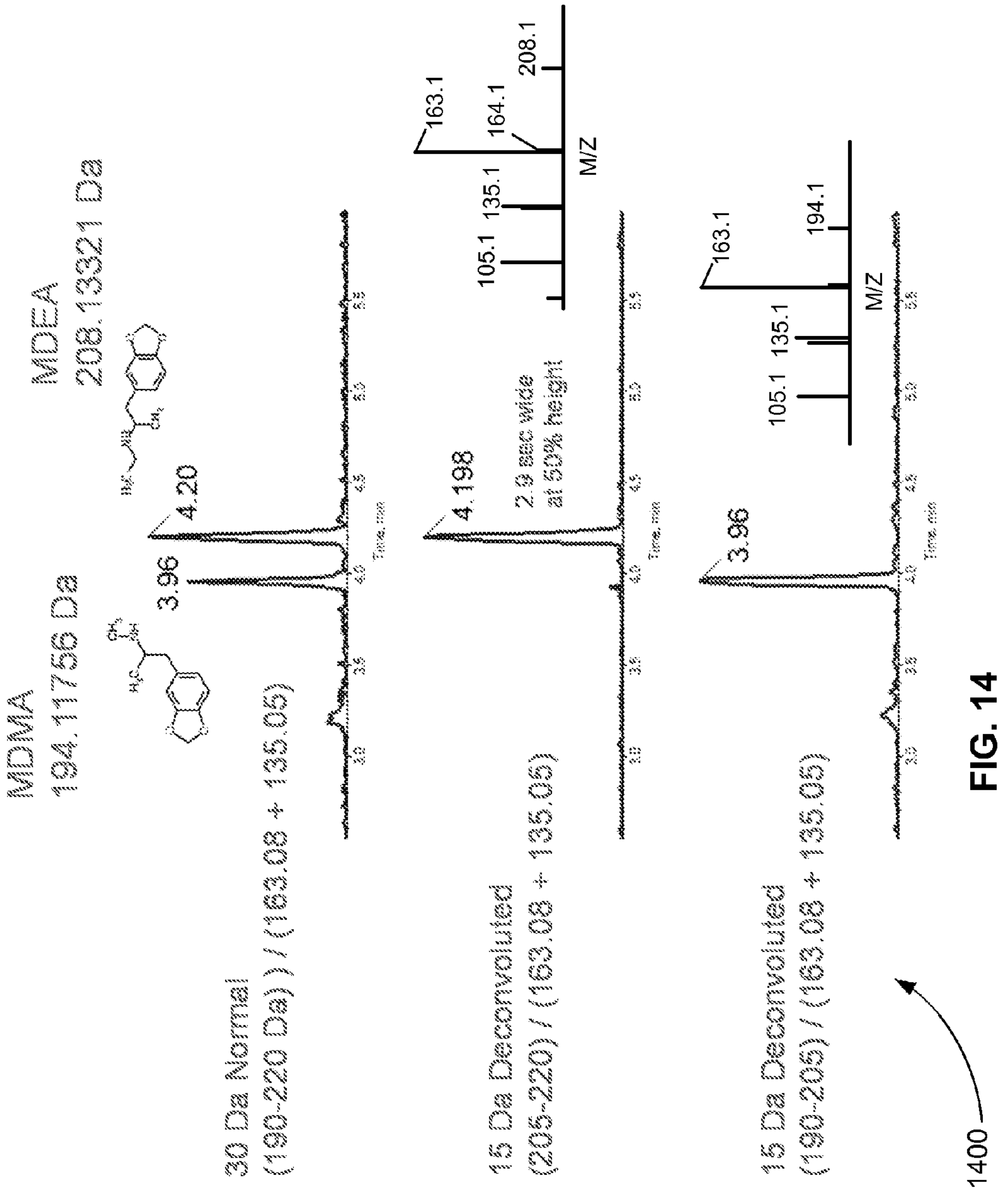
FIG. 14 illustrates exemplary plots showing detection of small molecules, in accordance with various embodiments.

FIG. 14 illustrates exemplary plots 1400 showing detection of small molecules, in accordance with various embodiments.

Rapid LC separation can easily produce peaks of less than 3 seconds in width. Using SWATH™ to monitor for all compounds requires windows that often cover related compounds, which have very similar fragmentation patterns. Confident Identification of these compounds would require careful attention to retention time.

In various embodiments, with overlapping windows, the data can be deconvoluted to narrower windows, enabling easier identification of the compound.

CONCLUSION

In summary, methods and systems provide improved data quality after demultiplexing of overlapped acquisition windows. Specifically, overlapping windows enable deconvolution to narrower windows without loss in duty cycle, and narrower windows improve MS/MS quality and quantitative properties.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for identifying missing product ions after demultiplexing product ion spectra produced by overlapping precursor ion transmission windows in sequential windowed acquisition tandem mass spectrometry, comprising:

a tandem mass spectrometer that performs overlapping sequential windowed acquisition on a sample by on each cycle, stepping a precursor mass window across a mass range, fragmenting transmitted precursor ions of each stepped precursor mass window, and analyzing product ions produced from the fragmented transmitted precursor ions, and between at least two cycles, shifting the stepped precursor mass window to produce overlapping mass windows between the at least two cycles, wherein the overlapping sequential windowed acquisition produces a product ion spectrum for each stepped precursor mass window for each cycle of the at least two cycles; and a processor in communication with the tandem mass spectrometer that receives a plurality of overlapping stepped precursor mass windows and their corresponding product ion spectra for the at least two cycles from the tandem mass spectrometer, selects a first precursor mass window and the corresponding first product ion spectrum from the plurality of overlapping stepped precursor mass windows and their corresponding product ion spectra, and demultiplexes a product ion spectrum for each overlapped portion of the first precursor mass window producing two or more demultiplexed first product ion spectra for the first precursor mass window by for each overlapped portion of the first precursor mass window, (a) adding the first product ion spectrum and a product ion spectrum of an overlapping precursor mass window producing a summed product ion spectrum and (b) subtracting product ion spectra of two or more precursor mass windows adjacent to the first precursor mass window and the overlapping precursor mass window that overlap with non-overlapping portions of the first precursor mass window and the overlapping precursor mass window from the summed product ion spectrum one or more times, adds the two or more demultiplexed first product ion spectra together producing a reconstructed summed demultiplexed first product ion spectrum, and identifies missing product ions in the summed demultiplexed first product ion spectrum by comparing the summed demultiplexed first product ion spectrum and the first product ion spectrum.

2. The system of claim 1, wherein comparing the summed demultiplexed first product ion spectrum and the first product ion spectrum comprises subtracting the summed demultiplexed first product ion spectrum from the first product ion spectrum.

3. The system of claim 1, wherein the processor further adds one or more missing product ions of the identified missing product ions back to one or more product ion spectra of the two or more demultiplexed first product ion spectra to improve the data quality of the one or more product ion spectra.

4. The system of claim 1, wherein the processor further applies shape weightings to each product ion spectrum corresponding to each stepped precursor mass window of the plurality of overlapping stepped precursor mass windows based on the shape of each stepped precursor mass window.

5. The system of claim 1, wherein the processor further uses shape weightings assigned to the first product ion spectrum, the product ion spectrum of an overlapping precursor mass window, and the product ion spectra of two or more precursor mass windows adjacent to the first precursor mass window and the overlapping precursor mass window that overlap with non-overlapping portions of the first precursor mass window and the overlapping precursor mass in steps (a) and (b) of the demultiplexing step of claim 1.

6. The system of claim 1, wherein the processor further receives from the tandem mass spectrometer a precursor spectrum for each stepped precursor mass windows of the plurality of overlapping stepped precursor mass windows and applies precursor ion weightings to each product ion spectrum corresponding to each stepped precursor mass window of the plurality of overlapping stepped precursor mass windows based on whether any precursor ions exist in each stepped precursor mass window.

7. The system of claim 1, wherein the processor further uses precursor ion weightings assigned to the first product ion spectrum, the product ion spectrum of an overlapping precursor mass window, and the product ion spectra of two or more precursor mass windows adjacent to the first precursor mass window and the overlapping precursor mass window that overlap with non-overlapping portions of the first precursor mass window and the overlapping precursor mass in steps (a) and (b) of the demultiplexing step of claim 1.

8. A method for identifying missing product ions after demultiplexing product ion spectra produced by overlapping precursor ion transmission windows in sequential windowed acquisition tandem mass spectrometry, comprising:

- performing overlapping sequential windowed acquisition on a sample using a tandem mass spectrometer by
  - on each cycle, stepping a precursor mass window across a mass range, fragmenting transmitted precursor ions of each stepped precursor mass window, and analyzing product ions produced from the fragmented transmitted precursor ions, and
  - between at least two cycles, shifting the stepped precursor mass window to produce overlapping mass windows between the at least two cycles,
  - wherein the overlapping sequential windowed acquisition produces a product ion spectrum for each stepped precursor mass window for each cycle of the at least two cycles;
- receiving a plurality of overlapping stepped precursor mass windows and their corresponding product ion spectra for the at least two cycles from the tandem mass spectrometer using a processor;
- selecting a first precursor mass window and the corresponding first product ion spectrum from the plurality of overlapping stepped precursor mass windows and their corresponding product ion spectra using the processor;
- demultiplexing a product ion spectrum for each overlapped portion of the first precursor mass window producing two or more demultiplexed first product ion spectra for the first precursor mass window using the processor by
  - for each overlapped portion of the first precursor mass window,
    - (a) adding the first product ion spectrum and a product ion spectrum of an overlapping precursor mass window producing a summed product ion spectrum and
    - (b) subtracting product ion spectra of two or more precursor mass windows adjacent to the first precursor mass window and the overlapping precursor mass window that overlap with non-overlapping portions of the first precursor mass window and the overlapping precursor mass window from the summed product ion spectrum one or more times;
- adding the two or more demultiplexed first product ion spectra together producing a reconstructed summed demultiplexed first product ion spectrum using the processor; and
- identifying missing product ions in the summed demultiplexed first product ion spectrum by comparing the summed demultiplexed first product ion spectrum and the first product ion spectrum using the processor.

9. The method of claim 8, wherein comparing the summed demultiplexed first product ion spectrum and the first product ion spectrum comprises subtracting the summed demultiplexed first product ion spectrum from the first product ion spectrum.

10. The method of claim 8, wherein the processor further adds one or more missing product ions of the identified missing product ions back to one or more product ion spectra of the two or more demultiplexed first product ion spectra to improve the data quality of the one or more product ion spectra.

11. The method of claim 8, wherein the processor further applies shape weightings to each product ion spectrum corresponding to each stepped precursor mass window of the plurality of overlapping stepped precursor mass windows based on the shape of each stepped precursor mass window.

12. The method of claim 8, wherein the processor further uses shape weightings assigned to the first product ion spectrum, the product ion spectrum of an overlapping precursor mass window, and the product ion spectra of two or more precursor mass windows adjacent to the first precursor mass window and the overlapping precursor mass window that overlap with non-overlapping portions of the first precursor mass window and the overlapping precursor mass in steps (a) and (b) of the demultiplexing step of claim 8.

13. The method of claim 8, wherein the processor further receives from the tandem mass spectrometer a precursor spectrum for each stepped precursor mass windows of the plurality of overlapping stepped precursor mass windows and applies precursor ion weightings to each product ion spectrum corresponding to each stepped precursor mass window of the plurality of overlapping stepped precursor mass windows based on whether any precursor ions exist in each stepped precursor mass window.

14. The method of claim 8, wherein the processor further uses precursor ion weightings assigned to the first product ion spectrum, the product ion spectrum of an overlapping precursor mass window, and the product ion spectra of two or more precursor mass windows adjacent to the first precursor mass window and the overlapping precursor mass window that overlap with non-overlapping portions of the first precursor mass window and the overlapping precursor mass in steps (a) and (b) of the demultiplexing step of claim 8.

15. A computer program product, comprising a tangible computer-readable storage medium whose contents include a program with instructions being executed on a processor so as to perform a method for identifying missing product ions after demultiplexing product ion spectra produced by overlapping precursor ion transmission windows in sequential windowed acquisition tandem mass spectrometry, the method comprising:

- receiving a plurality of overlapping stepped precursor mass windows and their corresponding product ion spectra for the at least two cycles from a tandem mass spectrometer that performs overlapping sequential windowed acquisition on a sample using a measurement module by
  - on each cycle, stepping a precursor mass window across a mass range, fragmenting transmitted precursor ions of each stepped precursor mass window, and analyzing product ions produced from the fragmented transmitted precursor ions, and
  - between at least two cycles, shifting the stepped precursor mass window to produce overlapping mass windows between the at least two cycles, wherein the overlapping sequential windowed acquisition produces a product ion spectrum for each stepped precursor mass window for each cycle of the at least two cycles;

selecting a first precursor mass window and the corresponding first product ion spectrum from the plurality of overlapping stepped precursor mass windows and their corresponding product ion spectra using the analysis module;

demultiplexing a product ion spectrum for each overlapped portion of the first precursor mass window producing two or more demultiplexed first product ion spectra for the first precursor mass window using the analysis module by for each overlapped portion of the first precursor mass window, (a) adding the first product ion spectrum and a product ion spectrum of an overlapping precursor mass window producing a summed product ion spectrum and (b) subtracting product ion spectra of two or more precursor mass windows adjacent to the first precursor mass window and the overlapping precursor mass window that overlap with non-overlapping portions of the first precursor mass window and the overlapping precursor mass window from the summed product ion spectrum one or more times, adding the two or more demultiplexed first product ion spectra together producing a reconstructed summed demultiplexed first product ion spectrum using the analysis module, and identifying missing product ions in the summed demultiplexed first product ion spectrum by comparing the summed demultiplexed first product ion spectrum and the first product ion spectrum using the analysis module.

16. The computer program product of claim 15, wherein comparing the summed demultiplexed first product ion spectrum and the first product ion spectrum comprises subtracting the summed demultiplexed first product ion spectrum from the first product ion spectrum.

17. The computer program product of claim 15, wherein the method further adds one or more missing product ions of the identified missing product ions back to one or more product ion spectra of the two or more demultiplexed first product ion spectra to improve the data quality of the one or more product ion spectra.

18. The computer program product of claim 15, wherein the method further applies shape weightings to each product ion spectrum corresponding to each stepped precursor mass window of the plurality of overlapping stepped precursor mass windows based on the shape of each stepped precursor mass window.

19. The computer program product of claim 15, wherein the method further uses shape weightings assigned to the first product ion spectrum, the product ion spectrum of an overlapping precursor mass window, and the product ion spectra of two or more precursor mass windows adjacent to the first precursor mass window and the overlapping precursor mass window that overlap with non-overlapping portions of the first precursor mass window and the overlapping precursor mass in steps (a) and (b) of the demultiplexing step of claim 15.

20. The computer program product of claim 15, wherein the method further receives from the tandem mass spectrometer a precursor spectrum for each stepped precursor mass windows of the plurality of overlapping stepped precursor mass windows and applies precursor ion weightings to each product ion spectrum corresponding to each stepped precursor mass window of the plurality of overlapping stepped precursor mass windows based on whether any precursor ions exist in each stepped precursor mass window.

* * * * *